Feb. 26, 1957     R. K. LITTLE     2,782,440
DEVICE FOR CLEANING A COFFEE MAKER
Filed Jan. 6, 1954
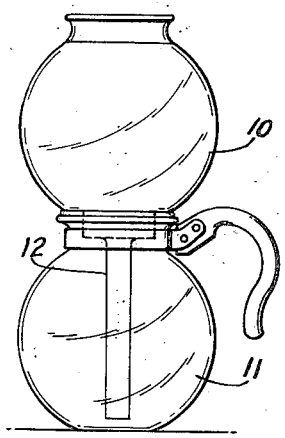
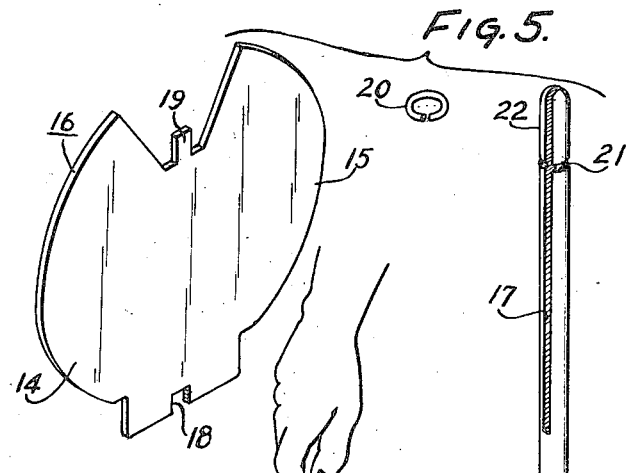
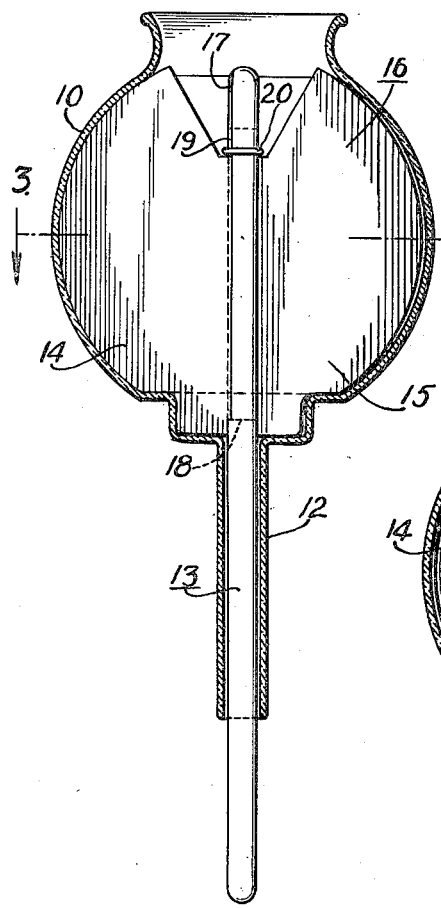
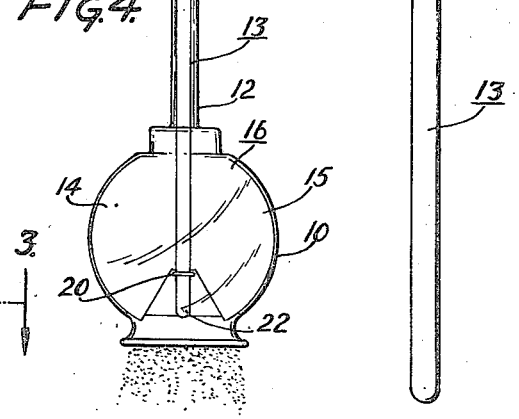
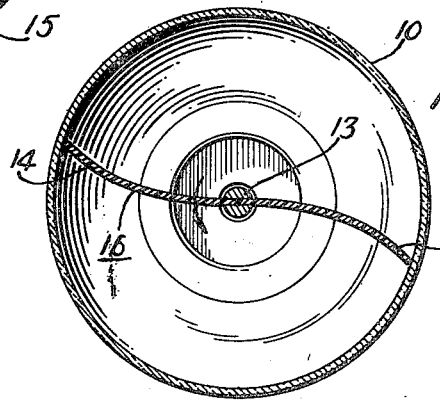
Inventor:
Robert K. Little
by his Attorneys
Howson & Howson

United States Patent Office 2,782,440
Patented Feb. 26, 1957

2,782,440

DEVICE FOR CLEANING A COFFEE MAKER

Robert K. Little, Philadelphia, Pa.

Application January 6, 1954, Serial No. 402,427

4 Claims. (Cl. 15—213)

This invention relates to a device for cleaning a coffee maker of the so-called vacuum type which employs an upper bowl having an opening at its top and a tubular extension at its bottom.

In this type of coffee maker, the coffee grounds are retained within the said bowl and tend to adhere to the inner surface thereof. If the bowl has a sufficiently large opening, it can be cleaned by scraping the inner surface with the hand or by wiping with a wash cloth but this is not a satisfactory way of removing the grounds. Then too, the bowl usually has a small opening which makes it difficult, if not impossible, to clean the bowl with the hand or with a wash cloth. In view of the fact that vacuum type coffee makers are widely used both in homes and in public places such as restaurants, the cleansing of the upper bowl has presented a substantial problem. Such proposals as have been made toward a solution of the problem have not been practical.

The principal object of the present invention is to provide a device which enables easy and efficient cleansing of the upper bowl of a vacuum type coffee maker.

Another object of the invention is to provide a device for this purpose which is simple and practical.

The invention may be fully understood from the following detailed description with reference to the accompanying drawing, wherein Fig. 1 is a small scale illustration of a typical vacuum type coffee maker;

Fig. 2 is a sectional view taken longitudinally through the upper bowl of the coffee maker, with the device of the present invention inserted for cleaning the bowl;

Fig. 3 is a sectional view taken along line 3—3 of Fig. 2;

Fig. 4 is a small scale view showing the manner of use of the cleaning device; and Fig. 5 is an exploded perspective view showing the parts of the device.

In the use of a vacuum type coffee maker such as shown in Fig. 1, a filter is placed in the bottom of the upper bowl 10, and the ground coffee is also placed in the upper bowl. Water is placed in the lower bowl 11, and upon heating, the water rises through the tubular extension 12 into the upper bowl where the coffee beverage is made. When the heat is discontinued, the beverage passes downwardly into the lower bowl while the coffee grounds remain in the upper bowl. Due to the fact that practically all of the water rises to the upper bowl in the first stage of the coffee-making operation, the coffee grounds are spread over the inside surface of the upper bowl and adhere thereto.

In accordance with the present invention, there is provided a cleaning device comprising a rigid handle 13 sufficiently small in cross-section to be insertable downward into the tubular extension 12 as shown in Fig. 2, and at least one cleaning flap or vane secured to the handle to be drawn through the top opening of the bowl 10 and to be disposed within the bowl when the handle is inserted into the tubular extension 12. The handle, which may be formed of wood or other suitable material, is of sufficient length to enable manual rotary movement thereof.

In the form of the device shown, there are two cleaning flaps 14 and 15 which extend in opposed directions laterally from the handle, although it will be understood that the invention contemplates the use of any suitable construction and any usable number of cleaning flaps. The cleaning flaps may be made of any suitable material, such as rubber. Where the bowl has a restricted upper opening, the flaps or vanes must be sufficiently flexible to be distortable or deformable so as to be capable of being drawn through the upper opening of the bowl, but they should also be sufficiently rigid to exert wiping force on the inside surface of the bowl when the handle 13 is rotated, as shown in Fig. 3. The cleaning flaps should also be generally of the contour of the inner surface of the bowl.

In the form shown, the two flaps 14 and 15 are portions of a single member 16, as clearly shown in Fig. 5. The member 16 may be cut from sheet material of suitable thickness, according to the character of the material, to provide the desired flexibility and rigidity of the flaps. The handle 13 is provided with a slot 17 to receive the member 16. The latter is provided with a bottom recess 18 and with a top projection 19 to help secure it to the handle. With the member 16 in place, the notch or recess 18 interlocks the bottom of said member with the handle, and the projection 19 extends within the upper end portion of the slotted handle which is embraced by a split ring 20 placed in the recess 21. It will be noted also that the upper central portion of member 16 is recessed to make the flaps 14 and 15 more easily bendable as they are drawn through the top opening of the bowl and also to leave the associated end portion 22 of the handle free for grasping with the fingers.

Figs. 2 to 4 show the manner of using the device. With the filter removed from the bowl 10, the handle 13 is inserted through the bowl and through the tubular extension 12, drawing the flexible flaps or vanes 14 and 15 through the top opening of the bowl and into the bowl. With the device in position as shown in Fig. 2, the bowl may be inverted and the handle rotated or oscillated to cause wiping of the inside surface of the bowl so that the coffee grounds will be dislodged and will fall from the bowl, as shown in Fig. 4. It should be noted that the tubular extension 12 serves to retain the handle and to position the longitudinal axis of the cleaning device. Preferably, the cross-sectional area of the handle is such that the handle fits rather snugly within the tubular extension so that the latter may better serve as a positioning and retaining means. After the coffee grounds have been loosened and discharged, the cleaning device is removed by pushing it through the top opening of the bowl.

From the foregoing description it will be seen that the invention provides a very simple and easily usable device. While a particular form of the device has been illustrated and described, the invention is not limited thereto, but contemplates such other embodiments and such modifications as may occur to those skilled in the art.

I claim:

1. In a device for cleaning a coffee maker bowl having a main body bowl portion with an opening at its top and a tubular extension at its bottom, the combination comprising a rigid, elongated member consisting of a central stem having a lower end shaped to fit snugly within the tubular extension of the bowl, flexible cleaning flap means secured to an intermediate portion of said stem and adapted to exert a wiping force against the interior of said main body bowl portion when said stem is rotated with said flap means positioned within said main body bowl portion and the lower end of said stem bearing within said tubular extension, and a handle portion extending from at least one end of said stem.

2. A device as defined in claim 1, in which said stem is extended below the lower end of said flap means sufficiently to form a handle extension below the lower end of the tubular extension of said bowl when inserted therethrough from above, and in which a handle extension is also provided above the upper end of the location of securement of said flap means to said stem.

3. A device for cleaning a coffee maker bowl having an opening at its top and a tubular extension at its bottom, comprising a rigid handle having a lower portion insertable into said tubular extension and having a slot in its upper portion, said lower portion being dimensioned transversely in relation to said tubular extension to fit snugly therein, so that the tubular extension is caused to serve as a sleeve bearing for said handle, a resilient member seated in said slot and having a bottom recess to interlock it with the handle, and means to hold said member interlocked with the handle, said member comprising a pair of cleaning flaps or vanes extending laterally in opposite directions from said handle to be drawn through said opening and to be disposed within said bowl when the handle is inserted into said tubular extension, said handle being of sufficient length to protrude from said tubular extension for manual rotary movement, said flaps being sufficiently flexible to be distortable but being sufficiently rigid and of a size and contour to wipe the inside surface of said bowl and loosen coffee grounds therefrom upon rotary movement of the handle.

4. A device according to claim 3, wherein the portion of the handle to which said member is secured is extended free of said member for grasping with the fingers.

References Cited in the file of this patent

UNITED STATES PATENTS

| D. | 4,001 | Oblinger | Apr. 26, 1870 |
| | 72,072 | Musson | Dec. 10, 1867 |

FOREIGN PATENTS

| 291,620 | Great Britain | of 1928 |